(12) United States Patent
Choi et al.

(10) Patent No.: US 7,794,622 B2
(45) Date of Patent: Sep. 14, 2010

(54) PREPARATION METHOD OF A LIQUID CRYSTAL FILM HAVING UNIAXIAL ALIGNMENT AND LIQUID CRYSTAL DEVICE

(75) Inventors: Sung-Min Choi, Daejeon (KR); Hyo-Sik Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 181 days.

(21) Appl. No.: 11/976,861

(22) Filed: Oct. 29, 2007

(65) Prior Publication Data

US 2008/0129948 A1 Jun. 5, 2008

(30) Foreign Application Priority Data

Oct. 31, 2006 (KR) .................. 10-2006-0106742

(51) Int. Cl.
*C09K 19/00* (2006.01)
*C09K 19/06* (2006.01)
*C09K 19/52* (2006.01)

(52) U.S. Cl. .................... 252/299.01; 428/1.1; 428/1.2; 428/1.3; 430/20; 349/1

(58) Field of Classification Search ........... 428/1.1–1.3; 430/20; 252/299.01; 349/1
See application file for complete search history.

(56) References Cited

U.S. PATENT DOCUMENTS 5,726,728 A * 3/1998 Kondo et al. ................. 349/156
5,742,370 A * 4/1998 Kim et al. .................... 349/124

OTHER PUBLICATIONS

Shklyarevskiy, I.O., et al. "High Anisotropy of the Field-Effect Transistor Mobility in Magnetically Aligned Discotic Liquid-Crystalline Semiconductors", JACS Articles, *J. Am. Chem. Soc. 2005*, vol. 127, No. 46, pp. 16233-16237 (2005).
Tracz, A., et al., Uniaxial Alignment of the Columnar Super-Structure of a Hexa (Alkyl) Hexa-peri-hexabenzocoronene on Untreated Glass by Simple Solution Processing, JACS Communications, *J. Am. Chem. Soc. 2003*, vol. 125, No. 7, pp. 1682-1683 (2003).
Liu, C.Y., et al. "In-Situ Regrowth and Purification by Zone Melting of Organic Single-Crystal Thin Films Yielding Significantly Enhanced Optoelectronic Properties", *Chem. Mater.*, vol. 12, No. 8, pp. 2353-2362 (2000).
Van de Craats, A.M., et al., "Meso-Epitaxial Solution-Growth of Self-Organizing Discotic Liquid-Crystalline Semiconductors", *Adv. Mater.*, vol. 15, No. 7, pp. 495-499 (Mar. 17, 2003).

* cited by examiner

*Primary Examiner*—Geraldina Visconti
(74) *Attorney, Agent, or Firm*—The Nath Law Group; Jerald L. Meyer; Sungyeop Chung

(57) ABSTRACT

Disclosed is a method for preparation of a liquid crystal film having uniaxial alignment, comprising steps of: elevating temperature of a substrate coated with a nanostructure formed of liquid crystal molecules to a value sufficient to alter the nanostructure into a liquid phase; and decreasing the temperature to another value sufficient to again alter the liquid phase into a liquid crystal phase in the presence of a magnetic field to horizontally align the nanostructure of liquid crystal molecules.

5 Claims, 5 Drawing Sheets

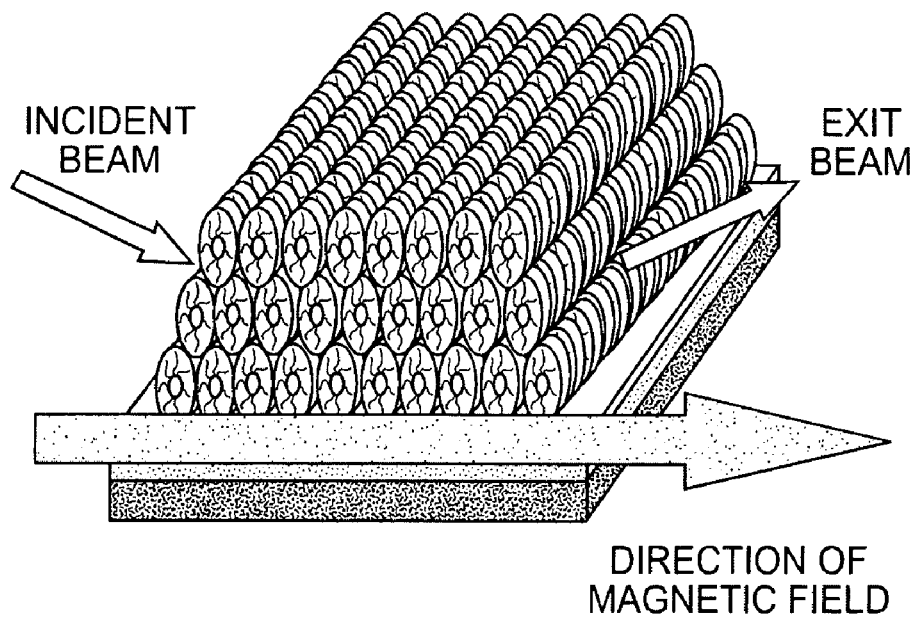
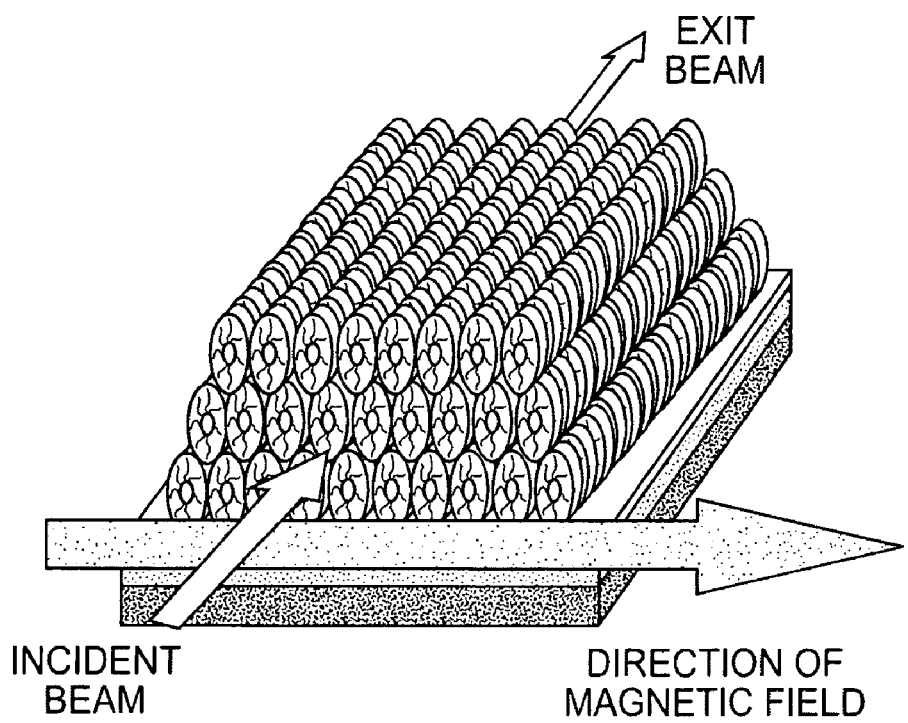
FIG. 5 (con't)

PREPARATION METHOD OF A LIQUID CRYSTAL FILM HAVING UNIAXIAL ALIGNMENT AND LIQUID CRYSTAL DEVICE

BACKGROUND OF THE INVENTION

This application claims priority to Korean Patent Application No. 2006-0106742, filed on Oct. 31, 2006, in the Korean Intellectual Property Office, the entire contents of which are hereby incorporated by reference.

FIELD OF THE INVENTION

The present invention relates to a method for preparation of liquid crystal devices generally used in manufacturing electronic devices and, more particularly, to a simple method for preparation of a liquid crystal film having uniform alignment in a single direction (that is, uniaxial alignment) on a wide area of a substrate, for example, consisting of silicon material and, liquid crystal thin films produced by the above method.

DESCRIPTION OF THE RELATED ART

Liquid crystal, especially, a disc type liquid crystal has one-dimensional structure in a columnar form created by self-assembling liquid crystal molecules through $\pi$-$\pi$ bonding between the liquid crystal molecules. Such disc type liquid crystal becomes a liquid phase named an isotropic phase in that individual molecules freely move and do not form a constant structure by elevating temperature of the liquid crystal, while the molecules are combined together to generate a liquid crystal phase in a columnar form by decreasing the temperature.

In a case where molecules of the disc type liquid crystal are oriented in a single direction in the form of a column, the liquid crystal shows superior electrical conductivity in the direction of alignment, thereby being potentially used in electronic device applications including field effect transistor (FET), light emitting diode (LED) and the like. Therefore, uniaxial alignment processes for disc type liquid crystal columns have been studied as important technologies in regard to application of the disc type liquid crystal.

Up to date, there have been methods for uniaxial alignment of molecules in a variety of disc type liquid crystals. Representative examples of such uniaxial alignment methods include: a process for alignment of disc type liquid crystal that aligns molecules of the liquid crystal in a direction of moving a substrate by spraying a solution of the disc type liquid crystal over the substrate by means of nozzles to generate a concentration gradient while evaporating a solvent portion, as reported in J. Am. Chem. Soc. 2003, 125, 1682-1683; a process for alignment of disc type liquid crystal that aligns molecules of the liquid crystal in a direction of generating a temperature gradient by partially heating the liquid crystal to generate the temperature gradient, as reported in Chem. Mater. 2000, 12, 2353-2362; a process for alignment, of disc type liquid crystal that aligns molecules of the liquid crystal in the same direction with a polymer layer by dropping a solution of the liquid crystal on the polymer layer which was already aligned over a substrate, as reported in Adv. Mater. 2003, 15, 495-499, etc., each of which is hereby incorporated by reference in its entirety.

There is a requirement for easier and simpler methods to produce disc type liquid crystal films having uniform alignment in a single direction on a wide area of a substrate in order to accomplish improvements in functions and productivity of liquid crystal devices preferable to use the liquid crystal in electronic devices.

SUMMARY OF THE INVENTION

Accordingly, the present invention is directed to solve the problems of conventional methods as described above and, an object of the present invention is to provide a method for simply preparing a liquid crystal film having uniaxial alignment on a wide area of a substrate, for example, consisting of silicon material.

Another object of the present invention is to provided a liquid crystal device including the above prepared liquid crystal thin film with the uniaxial alignment on the wide area of the substrate, especially, consisting of the silicon material, and/or an electronic device comprising the liquid crystal device.

According to the present invention, there is provided a method for preparation of a liquid crystal film having uniaxial alignment, comprising steps of: elevating temperature of a substrate coated with a nanostructure formed of liquid crystal molecules to a value sufficient to alter the nanostructure into a liquid phase; and decreasing the temperature to another value sufficient to again alter the nanostructure into a liquid crystal phase in the presence of a magnetic field to horizontally align the nanostructure of liquid crystal molecules.

The present invention also provides a method for preparation of a liquid crystal film having uniaxial alignment, comprising steps of: applying a liquid crystal to a hydrophobic surface-treated substrate to form a coating layer; elevating temperature of the coating layer to a value sufficient to alter the liquid crystal into a liquid phase; and decreasing the temperature to another value sufficient to again alter the liquid phase into a liquid crystal phase in the presence of a magnetic field.

The present invention provides a liquid crystal device having a liquid crystal film, comprising: a hydrophobic surface-treated substrate; and a nanostructure formed of liquid crystal molecules that has uniaxial alignment while being aligned in the presence of magnetic field along the horizontal direction to the surface-treated substrate.

Still further, the present invention provides an electronic device including a liquid crystal device having a liquid crystal film, in which the liquid crystal film comprises: a hydrophobic surface-treated substrate; and a nanostructure formed of liquid crystal molecules that has uniaxial alignment while being aligned in the presence of magnetic field along the horizontal direction to the surface-treated substrate.

BRIEF DESCRIPTION OF THE DRAWINGS

These and other objects, features, aspects, and advantages of preferred embodiments of the present invention will be more fully described in the following detailed description, taken in conjunction with the accompanying drawings. In the drawings.

DETAILED DESCRIPTION OF THE INVENTION

Figure 1:
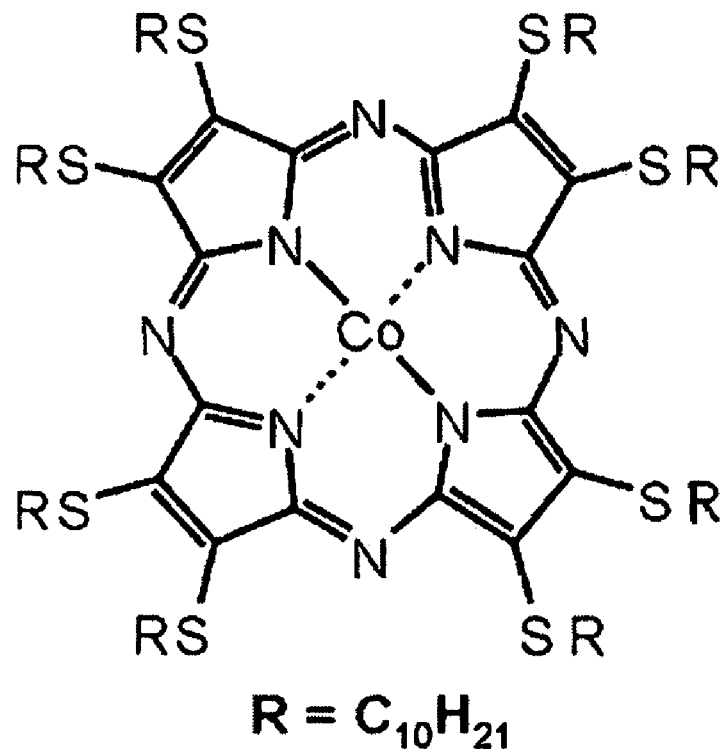
FIG. 1 shows a chemical structure of a disc type liquid crystal.

Hereafter, the present invention will be described in detail.

In an aspect of the present invention, there is provided a thin film having uniaxial alignment by applying magnetic field effect and surface effect to the film of disc type liquid crystal molecules.

In order to apply the surface effect, a surface treatment process is required for endowing a substrate with hydrophobic properties. Preferable materials used to produce the substrate with hydrophobic properties include, for example: alkyltrichlorosilane $(CH_3(CH_2)_{n-1}SiCl_3)$ such as octadecyltrichlorosilane (OTS) used for surfaces of insulating materials such as $SiO_2$ or $Al_2O_3$; and alkanethiol $(CH_3(CH_2)_{n-1}SH)$ including butanethiol (n=4), octanethiol (n=8), dodeqylthiol (n=12) and so on used for surfaces of metals such as Au, Ag, Cu, etc. The surface-treated substrate having hydrophobic properties by any one of the above materials interacts with alkyl groups having hydrophobic properties, which exist on the outer side of the disc type liquid crystal to allow the columnar nanostructure to be aligned only in the horizontal direction, not in a direction perpendicular to the substrate.

The liquid crystal used in the present invention may include, for example: metalloporphyrazine derivatives including cobalt octa(n-alkylthio)porphyrazine, nickel (Ni) octa(n-alkylthio)porphyrazine and zinc (Zn) octa(n-alkylthio)porphyrazine; hexa-peri-hexabenzocoronene derivatives including hexa(4-dodecylphenyl)hexa-peri-hexacoronene; and triphenylene derivatives including 2,3,6,7,10,11-hexa-alkoxytriphenylene, etc.

Using a spin coater can form the disc type liquid crystal film on the surface-treated substrate. The film forming method is not particularly limited but, if using the spin coating with controlled revolution speed and time, uniform films with different thicknesses can be coated on the substrate.

The columnar nanostructure in the disc type liquid crystal is possibly aligned in a direction perpendicular to a direction of the magnetic field by a process comprising: applying a constant magnitude of magnetic field to a thin film coated on the hydrophobic surface-treated substrate; elevating the temperature of the substrate to a value sufficient to alter liquid crystal molecules of the thin film into a liquid phase; and decreasing the temperature to another value sufficient to again alter the liquid phase into a liquid crystal phase. The magnitude of the magnetic field varies with kinds of the liquid crystal molecules.

In general, a disc type liquid crystal has an aromatic part at the center and comprises a structural assembly in the columnar form. The assembly has a free energy in the magnetic field represented by:

$$\Delta G = -\frac{1}{2}\Delta\chi(\vec{H}\cdot\vec{n})^2$$

wherein $\Delta\chi$ is a difference in magnetic susceptibilities of anisotropic molecules; $\vec{H}$ is a direction of magnetic field; and $\vec{n}$ is a direction of column.

Herein, because the aromatic part has diamagnetic properties, $\Delta\chi$ is demonstrated with a negative value. Thus, the columnar nanostructure of the disc type liquid crystal is aligned in a direction perpendicular to the magnetic field to minimize the free energy.

As described above, a combination of the magnetic field effect and the surface effect for alignment of the disc type liquid crystal is effective to simply produce the disc type liquid crystal film which has uniaxial alignment over a wide area of the substrate.

The columnar nanostructure of the disc type liquid crystal which has uniaxial alignment in every direction, is very useful for manufacturing electronic devices, for example, field effect transistor, light emitting diode, etc.

The present invention will become apparent from the following example with reference to the accompanying drawings. However, these are intended to illustrate the invention as a preferred embodiment of the present invention and do not limit the scope of the present invention.

Example

Cobalt octa(n-alkylthio)porphyrazine (CoS10) was used as a representative example of a disc type liquid crystal. This compound has a chemical formula illustrated in FIG. 1.

In order to produce a thin film, was prepared a silicon substrate with a washed surface. After cutting the silicon substrate into a size of 30 mm×30 mm and a thickness of 1 mm and placing the substrate sample into a glass bowl, a solution of sulfuric acid and hydrogen peroxide in a ratio of 2:1 was added to the bowl in an amount sufficient to immerse the substrate sample in the solution. Then, using a water bath type sonicator the mixture was sonicated in the bowl for 30 minutes.

Next, after pouring out the solution of sulfuric acid and hydrogen peroxide, acetone was added to the bowl in the amount sufficient to immerse the substrate sample in the solution, followed by repeating the same sonication process.

Then, after pouring out the acetone, ethanol was added to the bowl in the amount sufficient to immerse the substrate sample in the solution, followed by repeating the same sonication process.

Finally, the ethanol was poured out and replaced by deionized (DI) water, which was added to the bowl in the amount sufficient to immerse the substrate in the solution, followed by repeating the same sonication process. The treated silicon substrate sample was rinsed using DI water. The prepare substrate sample was stored in DI water.

For surface treatment of the silicon substrate, the stored sample was put into a glass bowl without overlapping of surfaces thereof after removing moisture of the sample with compressed air. The glass bowl was filled with a solution of toluene and OTS in a ratio of 250:1 and in an amount sufficient to immerse the sample in the solution and left at ambient temperature for 1 hour. Then, the glass bowl was emptied and filled with the solution excluding toluene in an amount sufficient to immerse the substrate sample in the solution, followed by repeating the same sonication process for 15 minutes using the water bath type sonicator. Finally, after rinsing the treated substrate sample with toluene, nitrogen gas was fed into the glass bowl to dry the sample under a nitrogen atmosphere.

In order to conduct the spin coating, there was a requirement to prepare a CoS10 solution by mixing the disc type liquid crystal CoS10 in a solvent. More particularly, 10 mg of CoS10 was charged in a vial and 1 mL of chloroform was added thereto to prepare the CoS10 solution with a constant concentration of 10 mg/ml.

The silicon substrate surface treated with OTS (abbreviated to "OTS-treated substrate"), which was prepared beforehand, was coated with the CoS10 solution by use of the spin coater. A OTS-treated substrate sample with a size of 30 mm×30 mm was placed on the spin coater, about 1 mL of the CoS10 solution was applied dropwise on the sample so as to cover the whole of surface of the substrate. Thereafter, rotation of the sample at 4000 rpm was performed for 30 seconds to produce a CoS10 thin film. After completion of the spin coating, the sample was left at ambient temperature for about 3 minutes to evaporate and remove the solvent portion from the sample, then, taken out of the spin coater.

Figure 2:
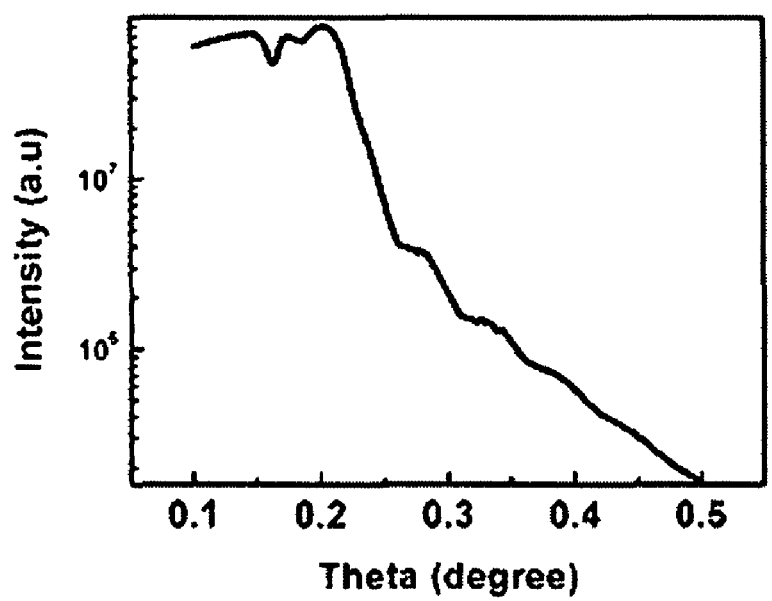
FIG. 2 shows a result of X-ray reflectivity measurement for a disc type liquid crystal film of the present invention.

From measurement of X-ray reflectivity, it was found that such prepared disc type liquid crystal film has a thickness of about 85 nm (see FIG. 2).

The alignment procedure which elevates the temperature of a disc type liquid crystal sample to a value sufficient to alter the sample into a liquid phase, and decreases the temperature to another value sufficient to again alter the liquid phase into a columnar liquid crystal phase in a magnetic field, is described in detail as follows:

A block for heating the sample was positioned between N and S poles of an electromagnet. After heating the block to 230° C. using a temperature controller, the sample was placed on the hot block and the magnetic field between the N and S poles was regulated to 1.07 T. After 15 minutes, a setup temperature of the temperature controller was changed to 80° C. and the sample underwent natural cooling to 80° C. then was separated from the block. From this process, the highest surface temperature of the sample was about 220° C., which is higher than a temperature that induces alteration from the columnar liquid crystal phase to the liquid phase of CoS10 prepared in this example as the disc type liquid crystal of the present invention.

In the process of cooling the liquid phase to be altered into the liquid crystal phase after forming the liquid phase of the disc type liquid crystal film, molecules of the CoS10 form a columnar structure and cause the structure to react and move in response of the magnetic field. The cooling temperature, 80° C., is lower than a temperature to alter the liquid phase into the liquid crystal phase. As a result, the disc type liquid crystal film was fixed as aligned by the magnetic field.

Figure 3:
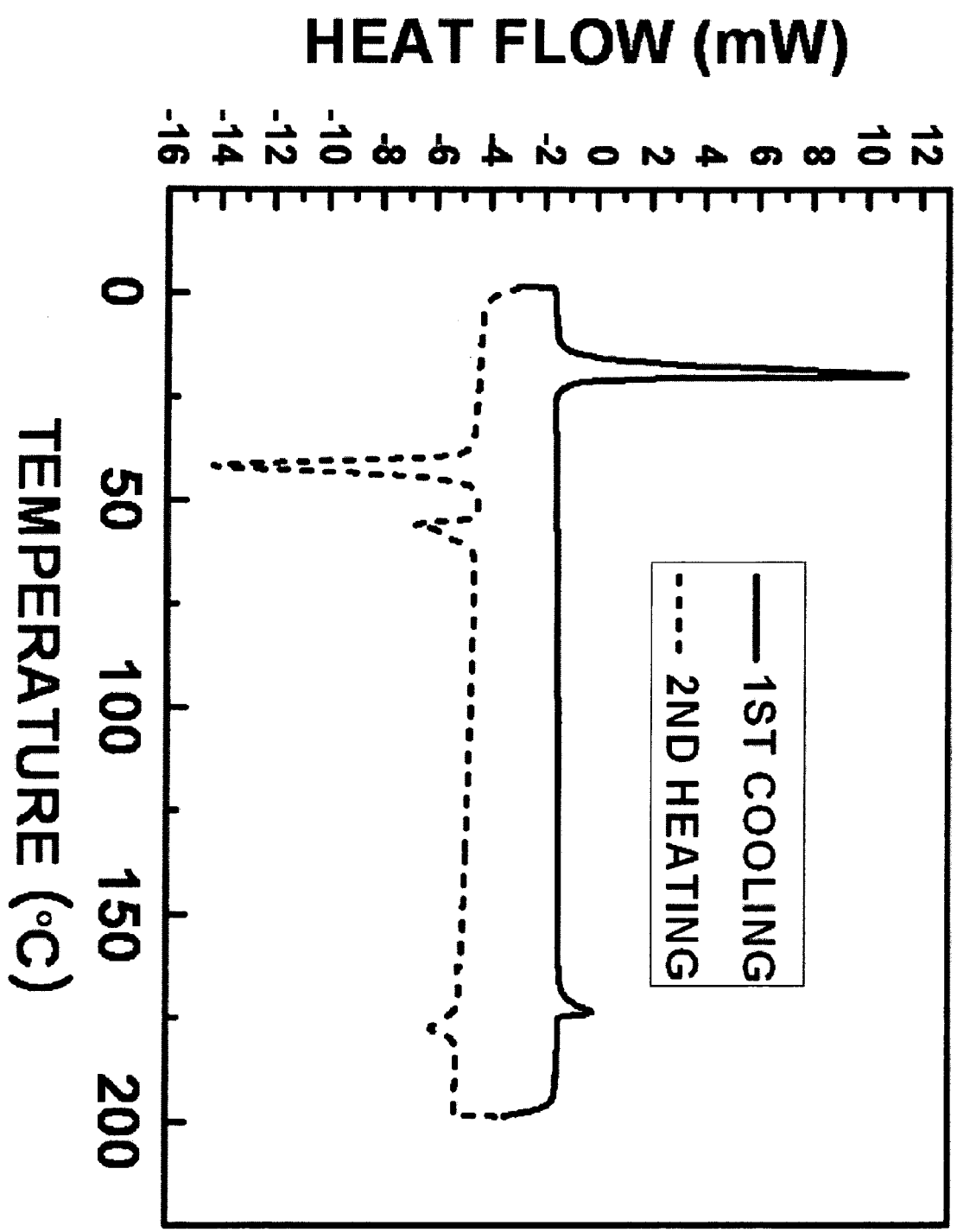
FIG. 3 shows a result of differential scanning calorimeter (DSC) measurement for the disc type liquid crystal film of the present invention.

Phase change temperature of CoS10 was determined by the differential scanning calorimetry (DSC) analysis (see FIG. 3).

Alignment of the disc type liquid crystal film was demonstrated by the grazing incidence small angle X-ray scattering (GISAXS) method.

Figure 4:
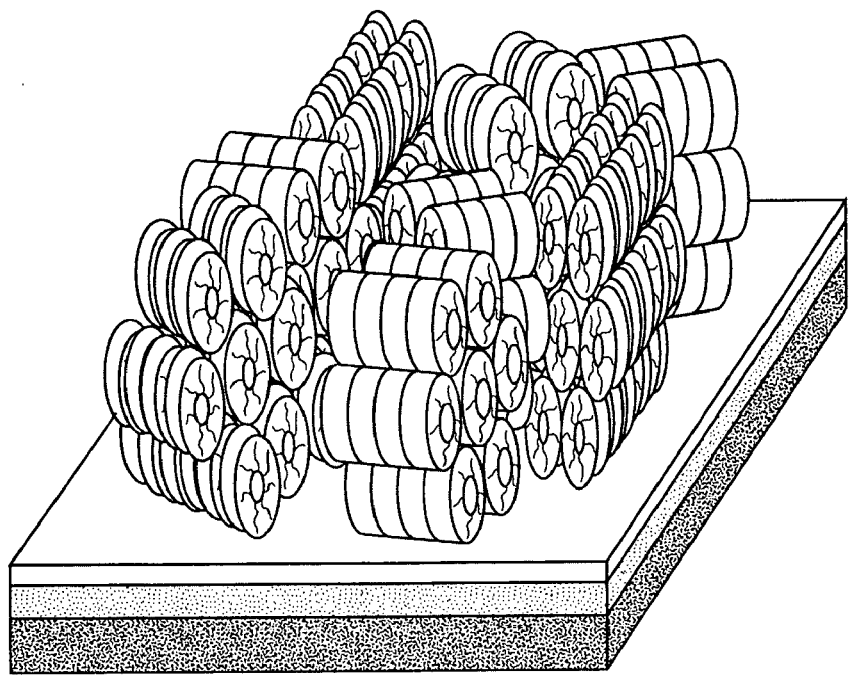
FIG. 4 shows a result of grazing incidence small-angle X-ray scattering (GISAXS) measurement for a thin film prepared without using a magnetic field.
Figure 4:
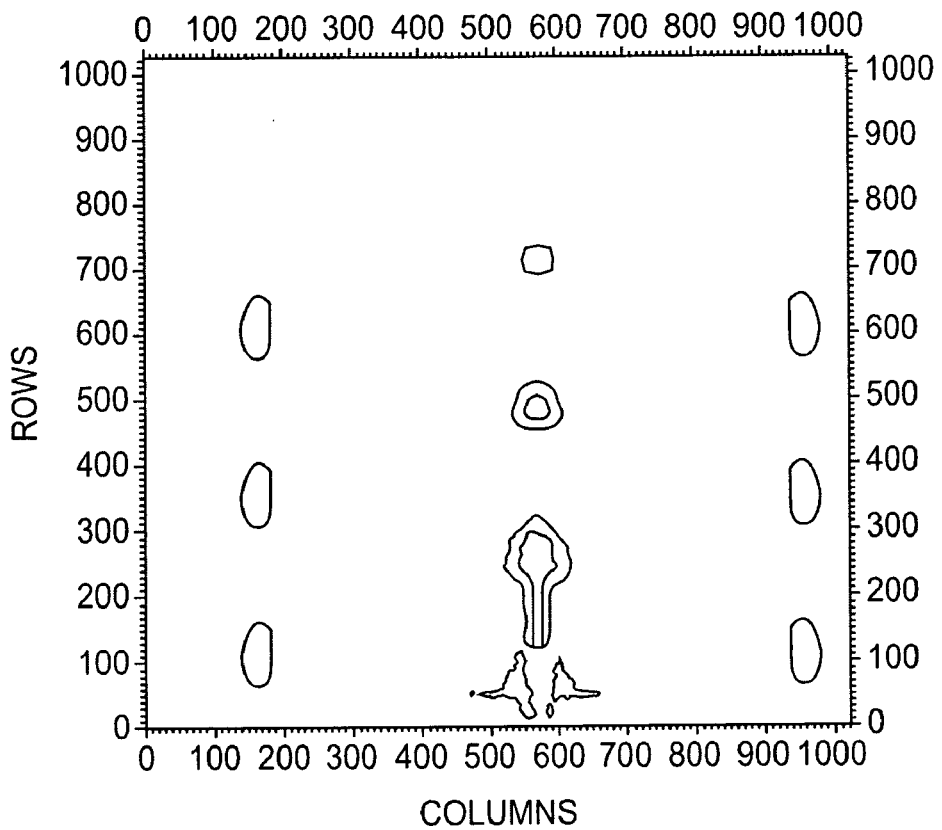
Figure 5:
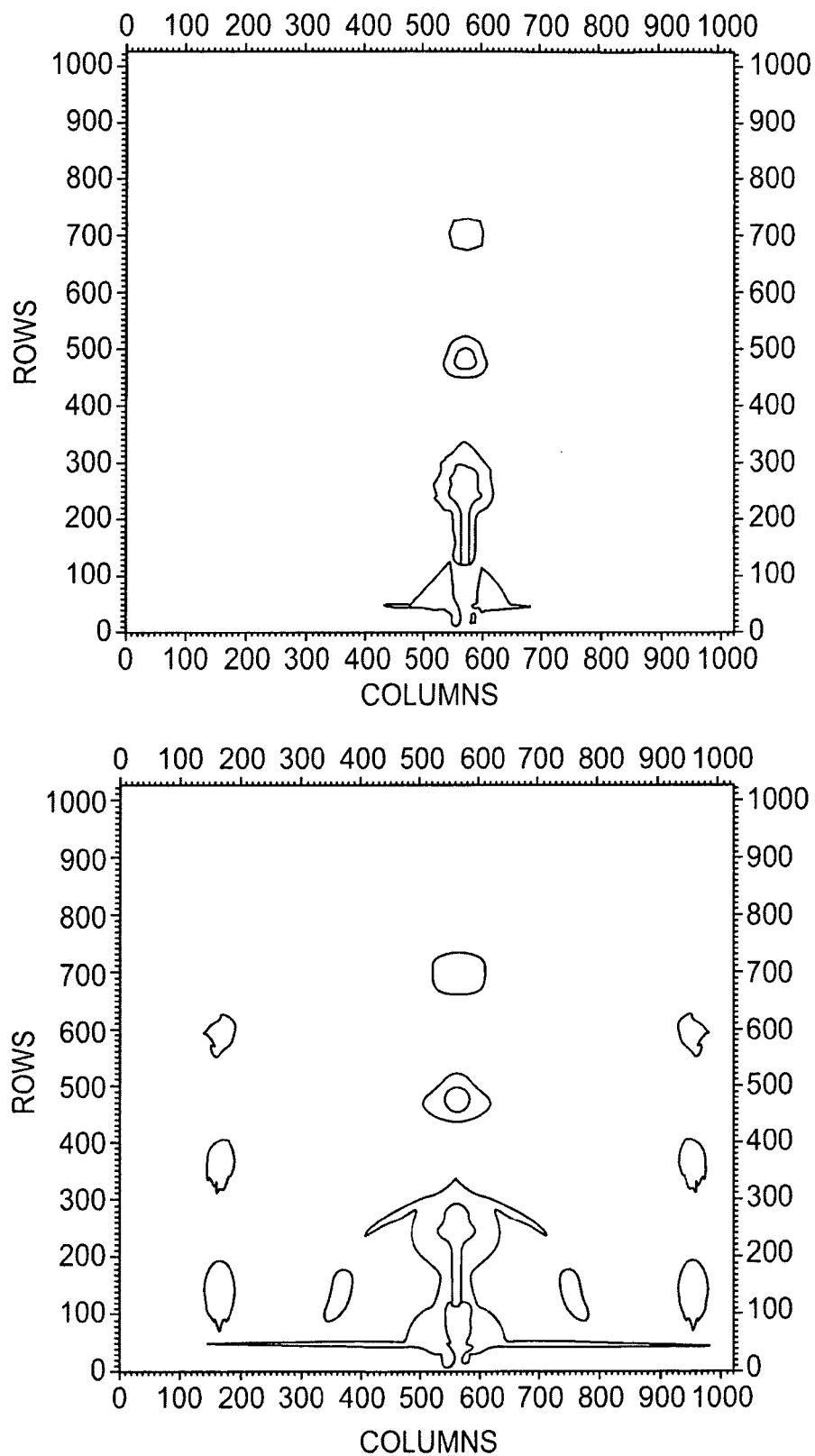
FIG. 5 shows a result of GISAXS measurement for a disc type liquid crystal film having uniaxial alignment according to the present invention.

In a case where the temperature was elevated then decreased without application of the magnetic field, the columnar nanostructure of the disc type liquid crystal has no uniaxial alignment and demonstrates a result shown in FIG. 4 independent of directions of X-ray incidence, although the structure is aligned in the horizontal direction to the silicon substrate by the surface effect. On the other hand, when applying the magnetic field, the columnar nanostructure of the disc type liquid crystal is aligned in the direction perpendicular to that of the magnetic field while being aligned in the horizontal direction to the silicon substrate, thereby displaying an experimental result as shown in FIG. 5.

Consequently, according to the present invention, a liquid crystal film having uniaxial alignment on a wide area of a substrate, for example, consisting of silicon material, can be simply prepared and efficiently used in industrial applications such as for electronic devices.

While the present invention has been described with reference to the preferred embodiment and example, it will be understood by those skilled in the art that various modifications and variations may be made therein without departing from the scope of the present invention as defined by the appended claims.

What is claimed is:

1. A method for preparation of a columnar nanostructure of a discotic liquid crystal film having uniaxial alignment, comprising steps of:
    applying a columnar nanostructure of discotic liquid crystal to a hydrophobic surface-treated substrate to form a coating layer;
    elevating temperature of the coating layer to a value sufficient to alter the columnar nanostructure of the discotic liquid crystal into a liquid phase; and
    decreasing the temperature to another value sufficient to again alter the liquid phase into a liquid crystal phase in the columnar nanostructure of the discotic liquid crystal in the presence of a magnetic field and a surface effect,
    wherein the columnar nanostructure of the discotic liquid crystal comprises cobalt octa(n-alkylthio)porphyrazine.

2. A columnar nanostructure device of discotic liquid crystal having a columnar nanostructure of a discostic liquid crystal film, comprising:
    a hydrophobic surface-treated substrate; and
    a columnar nanostructure of discotic liquid crystal molecules that has uniaxial alignment while being aligned in a horizontal direction to the surface-treated substrate in the presence of a magnetic field and a surface effect,
    wherein the columnar nanostructure of the discotic liquid crystal comprises cobalt octa(n-alkylthio)porphyrazine.

3. The columnar nanostructure device of the discotic liquid crystal according to claim 2, wherein the nanostructure is in the form of a column.

4. An electronic device including a columnar nanostructure device of discotic liquid crystal having a columnar nanostructure of a discotic liquid crystal film which comprises:
    a hydrophobic surface-treated substrate; and
    a columnar nanostructure of discotic liquid crystal molecules that has uniaxial alignment while being aligned in a horizontal direction to the surface-treated substrate in the presence of a magnetic field and a surface effect,
    wherein the columnar nanostructure of the discotic liquid crystal comprises cobalt octa(n-alkylthio)porphyrazine.

5. The method according to claim 1, wherein the magnetic field is applied to the film with a magnitude larger than 1.0 T.

* * * * *